United States Patent
Mohseni et al.

(10) Patent No.: US 9,402,203 B2
(45) Date of Patent: Jul. 26, 2016

(54) CONTROL CHANNEL COLLISION RESOLUTION

(71) Applicant: QUALCOMM Incorporated, San Diego, CA (US)

(72) Inventors: Jafar Mohseni, San Diego, CA (US); Neha Goel, Surrey (GB); Divaydeep Sikri, Surrey (GB); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/500,721

(22) Filed: Sep. 29, 2014

(65) Prior Publication Data

US 2016/0095015 A1   Mar. 31, 2016

(51) Int. Cl.
| | |
|---|---|
| *H04W 28/04* | (2009.01) |
| *H04L 5/00* | (2006.01) |
| *H04L 1/18* | (2006.01) |
| *H04W 72/02* | (2009.01) |
| *H04W 88/06* | (2009.01) |
| *H04W 60/00* | (2009.01) |

(52) U.S. Cl.
CPC ............ *H04W 28/044* (2013.01); *H04L 1/1854* (2013.01); *H04L 5/0078* (2013.01); *H04W 72/02* (2013.01); *H04W 60/005* (2013.01); *H04W 88/06* (2013.01)

(58) Field of Classification Search
CPC .............. H04W 28/044; H04W 72/04; H04W 72/1263; H04W 72/0406; H04W 72/0446; H04W 76/048; H04W 88/06; H04L 5/0078
See application file for complete search history.

(56) References Cited

U.S. PATENT DOCUMENTS

| | | | |
|---|---|---|---|
| 8,818,428 B2 | 8/2014 | Walke et al. | |
| 2013/0028202 A1* | 1/2013 | Hofmann | H04W 28/06 370/329 |
| 2013/0150013 A1 | 6/2013 | Liu et al. | |
| 2013/0150105 A1* | 6/2013 | Clevorn | H04W 48/12 455/501 |
| 2013/0329639 A1* | 12/2013 | Wietfeldt | H04W 88/06 370/328 |
| 2014/0038569 A1 | 2/2014 | Chin et al. | |
| 2014/0128082 A1 | 5/2014 | Chirayil | |
| 2014/0199993 A1 | 7/2014 | Dhanda et al. | |
| 2014/0213235 A1 | 7/2014 | Lou et al. | |
| 2015/0092613 A1* | 4/2015 | Yerrabommanahalli | H04M 3/4288 370/259 |

OTHER PUBLICATIONS

International Search Report and Written Opinion—PCT/US2015/047797—ISA/EPO—Nov. 24, 2015.

* cited by examiner

*Primary Examiner* — Curtis A Alia
(74) *Attorney, Agent, or Firm* — Foley & Lardner LLP

(57) ABSTRACT

Devices and methods are configured for resolving control channel transmission collision in a mobile device having first and second subscriptions (SUBs) when the first SUB is in an active voice call and the second SUB is in a held voice call. The devices and methods involve determining whether a control channel transmission of the first SUB would collide with a control channel transmission of the second SUB. In response to determining that the first SUB control channel transmission would collide with the second SUB control channel transmission, the devices and methods alternate the first SUB control channel transmission and the second SUB control channel transmission to avoid collision.

23 Claims, 6 Drawing Sheets

CONTROL CHANNEL COLLISION RESOLUTION

BACKGROUND

1. Field

Embodiments described herein generally relate to methods and devices for resolving collision of control channel transmissions when a mobile phone device has an active call on one subscription, a held call on another subscription, and the mobile phone device has one transmitter with which to transmit active call control channel transmissions and held call control channel transmissions.

2. Background

A Slow Associated Control Channel (SACCH) is a control channel to transmit measurement reports from a (Dual SIM Dual Active) DSDA device to a base station (BS), where the BS determines whether to keep a current configuration, transfer, or drop a call. When each subscription (SUB) of the DSDA device is in a voice call (one active, the other held) and their SACCHs transmissions collide, the SACCH transmission of the active call is given higher priority. However, when the SACCH transmission of the active call is always prioritized, then, as a result, the BS will not receive measurement reports for the held call. This leads to more handovers or dropping of held calls due to SACCH blanking, since the BS did not receive measurements reports for the held calls.

SUMMARY

Various embodiments relate to methods and devices for resolving a collision of call control channel transmissions when a mobile device has a first active subscription on an active voice call and a second active subscription on a held voice call, and control channel transmissions for both calls are transmitted at the same time over one transmitter.

Various embodiments relate to a method for resolving control channel transmission collision in a mobile device having first and second subscriptions (SUBs) when the first SUB is in an active voice call and the second SUB is in a held voice call, the method comprising: determining, by the mobile device, whether a control channel transmission of the first SUB would collide with a control channel transmission of the second SUB; and alternating, by the mobile device, the first SUB control channel transmission and the second SUB control channel transmission to avoid collision, in response to determining the first SUB control channel transmission would collide with the second SUB control channel transmission.

In some embodiments, the mobile device is a Dual SIM dual Active (DSDA) mobile device comprising two SIMs, two receivers, and one transmitter; the method further comprising: receiving the first SUB on one receiver; receiving the second SUB on the other receiver; and transmitting the first SUB control channel transmission and the second SUB control channel transmission on the one transmitter.

In some embodiments, when the determining indicates collision and one or more prioritization conditions are met, prioritizing, by the mobile device, control channel transmission for one SUB over control channel transmission for the other SUB, by transmitting control channel transmission of the one SUB when the one SUB would otherwise have been blanked in the alternating of first and second SUB control channel transmissions.

In some embodiments, a prioritization condition comprises the one SUB having a signal strength below a preset strength threshold or the one SUB having a signal quality below a preset quality threshold.

In some embodiments, when the determining indicates collision, determining, by the mobile device, whether the active call conditions are poor; when the determining of the active call conditions indicates the active call conditions are not poor, determining, by the mobile device, whether the held call conditions are poor; and when the determining of the held call conditions indicates the held call conditions are not poor, alternating, by the mobile device, first SUB control channel transmission and second SUB control channel transmission.

In some embodiments, when the determining of the active call conditions indicates the active call conditions are poor, prioritizing, by the mobile device, first SUB control channel transmissions.

In some embodiments, when the determining of the held call conditions indicates the held call conditions are poor, prioritizing, by the mobile device, second SUB control channel transmissions.

In some embodiments, in the determining of the active call conditions, comparing, by the mobile device, previous active call signal strength value to a preset strength threshold and comparing, by the mobile device, previous active call signal quality value to a preset quality threshold.

In some embodiments, the active call conditions are sufficiently poor when the previous active call signal strength is below the preset strength threshold, the previous active call signal quality is below the preset quality threshold, or both.

In some embodiments, the control channel is SACCH.

Embodiments described herein relate to a mobile device comprising: a processor configured to: determine whether a control channel transmission of a first SUB would collide with a control channel transmission of a second SUB; and alternate the first SUB control channel transmission and the second SUB control channel transmission to avoid collision, in response to determining that the first SUB control channel transmission would collide with the second SUB control channel transmission.

In some embodiments, the mobile device is a Dual SIM dual Active (DSDA) mobile device comprising two SIMs, two receivers, and one transmitter, wherein the mobile device is configured to: receive the first SUB on one receiver; receive the second SUB on the other receiver; and transmit the first SUB control channel transmission and the second SUB control channel transmission on the one transmitter.

In some embodiments, when the determination indicates collision and one or more prioritization conditions are met, prioritize control channel transmission for one SUB over control channel transmission for the other SUB, by transmitting control channel transmission of the one SUB when the SUB would otherwise have been blanked in the alternating of the first and second SUB control channel transmissions.

In some embodiments, a prioritization condition comprises the one SUB having a signal strength below a preset strength threshold, or the one SUB having a signal quality below a preset quality threshold.

In some embodiments, determine, when the determining indicates collision, whether the active call conditions are poor; determine, when the determining of the active call conditions indicates the active call conditions are not poor, whether the held call conditions are poor; and alternate, when the determining of the held call conditions indicates the held call conditions are not poor, first SUB control channel transmission and second SUB control channel transmission.

In some embodiments, prioritize, when the determining of the active call conditions indicates the active call conditions are poor, first SUB control channel transmissions.

In some embodiments, prioritize, when the determining of the held call conditions indicates the held call conditions are poor, second SUB control channel transmissions.

In some embodiments, compare, to determine the active call conditions, previous active call signal strength value to a preset strength threshold and previous active call signal quality value to a preset quality threshold.

In some embodiments, the active call conditions are sufficiently poor when the previous active call signal strength value is below the preset strength threshold, the previous active call signal quality value is below the preset quality threshold, or both.

In some embodiments, the control channel is SACCH.

Embodiments described herein relate to a non-transitory computer-readable recording medium storing therein at least one computer program, which, when executed, causes a computer to perform a method for resolving control channel transmission collision in a mobile device having first and second subscriptions (SUBs), when the first SUB is in an active voice call and the second SUB is in a held voice call, the method comprising: determining that a control channel transmission of the first SUB would collide with a control channel transmission of the second SUB; and alternating the first SUB control channel transmission and the second SUB control channel transmission to avoid collision, in response to determining the first SUB control channel transmission would collide with the second SUB control channel transmission.

Embodiments relate to a method for resolving control channel transmission collision in a mobile device having first and second subscriptions (SUBs) when the first SUB is in an active voice call and the second SUB is in a held voice call, the method comprising: means for determining, by the mobile device, whether a control channel transmission of the first SUB would collide with a control channel transmission of the second SUB; and means for alternating, by the mobile device, the first SUB control channel transmission and the second SUB control channel transmission to avoid collision, in response to determining the first SUB control channel transmission would collide with the second SUB control channel transmission.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the various embodiments.

DETAILED DESCRIPTION

Figure 1:
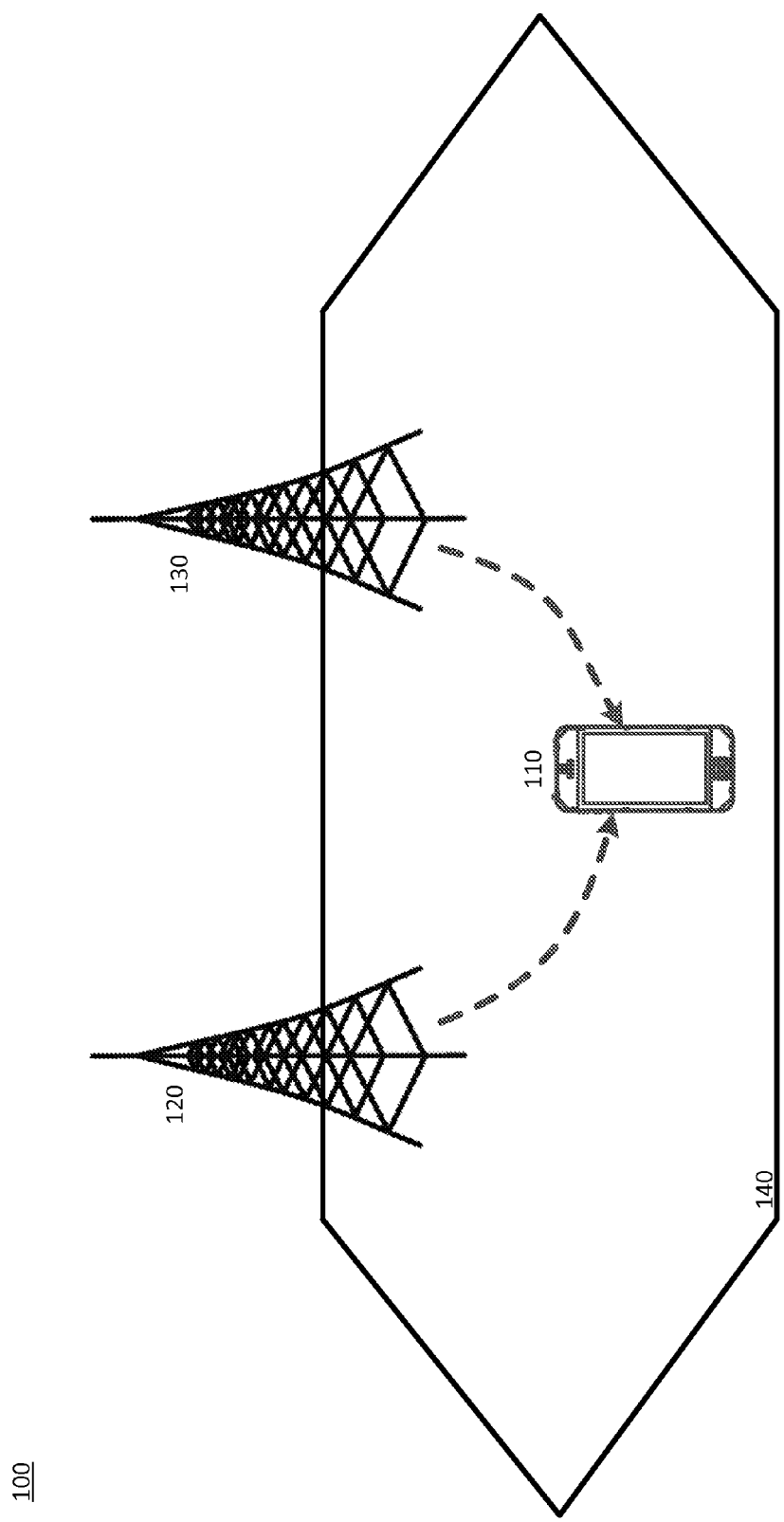
FIG. 1 is a schematic diagram illustrating an example of a system according to various embodiments.

Various embodiments will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the invention or the claim.

Some modern communication devices, referred to herein as user equipment ("UE"), such as smart phones, tablet computers, and laptop computers, may contain one or more subscriber identity modules ("SIMs") that provide users of the UEs with access to one or multiple separate mobile networks, supported by radio access technologies ("RATs"). The UE may also be referred to as a mobile station ("MS") or mobile device. Examples of UE include, but are not limited to, mobile phones, laptop computers, smart phones, and other mobile communication devices of the like that are configured to connect to one or more RATs. Examples of RATs may include, but are not limited to, Global Standard for Mobile ("GSM"), Code Division Multiple Access ("CDMA"), CDMA2000, Time Division-Code Division Multiple Access ("TD-CDMA"), Time Division-Synchronous Code Division Multiple Access ("TD-SCDMA"), Wideband-Code Division Multiple Access ("W-CDMA"), Time Division Multiple Access ("TDMA"), Frequency Division Multiple Access ("FDMA"), Long-Term Evolution ("LTE"), wireless fidelity ("Wi-Fi"), various 3G standards, various 4G standards, Voice Over LTE ("VOLTE"), Simultaneous GSM and LTE ("SGLTE"), Simultaneous Voice and LTE ("SVLTE"), Circuit Switched Fall Back ("CSFB"), frequency modulation ("FM"), Bluetooth ("BT"), near field communication device ("NFC"), and the like.

Embodiments described herein related to multi-SIM UEs. A UE that includes a plurality of SIMs and connects to two or more separate RATs using a same set of RF resources, e.g., radio-frequency ("RF") transceivers, is a multi-SIM-multi-standby ("MSMS") communication device. Further, a UE that includes a plurality of SIMs and connects to two or more separate mobile networks using two or more separate sets of RF resources is termed a multi-SIM-multi-active ("MSMA") communication device. An example MSMA communication device is a dual-SIM-dual-active ("DSDA") communication device, which includes two SIM cards/subscriptions, each associated with a separate RAT, where both SIMs may remain active at any given time. In another example, the MSMA device may be a triple-SIM-triple-active ("TSTA") communication device, which includes three SIM cards/subscriptions, each associated with a separate RAT, where all three SIMs may remain active at any given time. In other examples, the MSMA communication device may be other suitable multi-SIM communication devices, with, for example, four or more SIMs, such that all SIMs are active at any given time.

In addition, a plurality of modes are enabled by one SIM, such that each mode may correspond to a separate RAT. Such SIM is a multi-mode SIM. A UE may include one or more multi-mode SIMs. The UE may be a MSMS communication device (such as, but not limited to, a DSDS or a TSTS communication device), a MSMA communication device (e.g., a DSDA, TSTA communication device, or the like), or a multi-mode device.

As used herein, UE refers to one of a cellular telephone, smart phone, multimedia Internet-enabled cellular telephone, and similar personal electronic device that include one or more SIMs, a programmable processor, memory, and circuitry for connecting to one or more mobile communication networks (simultaneously or sequentially). Various embodiments may be useful in mobile communication devices, such as smart phones, and such devices are referred to in the descriptions of various embodiments. However, the embodiments may be useful in any electronic device, such as a DSDA communication device, a TSTA communication device, or other suitable multi-SIM, multi-mode devices, that may individually maintain one or more subscriptions that utilize one or a plurality of RF resources.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service with a particular network, the term "SIM" may also be used herein as a shorthand reference to the communication service associated with and enabled by the information (e.g., in the form of various parameters) stored in a particular SIM as the SIM and the communication network, as well as the services and subscriptions supported by that network, correlate to one another.

Embodiments described herein are directed to improving collision resolution of control channel transmissions when multiple active SIMs, each on a voice call through separate receivers, attempt to transmit at the same time through the same transmitter. This may arise when the device is DSDA, with two active SIMs and two receivers and one transmitter, or when the device is MSMA, with each active SIM having its own receiver and using transmitters shared with other SIMs.

With reference to FIG. 1, a schematic diagram of a system 100 is shown in accordance with various embodiments presented herein. The system 100 may include a UE 110, a first base station 120, and a second base station 130. In some embodiments, each of the first base station 120 and the second base station 130 may represent a separate RAT. In some embodiments, each RAT may be transmitted by the associated base station at different physical locations (i.e., the first base station 120 and the second base station 130 may be at different locations). In other embodiments, each RAT may be transmitted by the associated base station at the same physical location (i.e., the first base station 120 and the second base station 130 may be physically joined), or the base stations are the same base station.

The first base station 120 and the second base station 130 may each include at least one antenna group or transmission station located in the same or different areas, where the at least one antenna group or transmission station may be associated with signal transmission and reception. The first base station 120 and the second base station 130 may each include one or more processors, modulators, multiplexers, demodulators, demultiplexers, antennas, and the like for performing the functions described herein. In some embodiments, the first base station 120 and the second base station 130 may be utilized for communication with the UE 110 and may be an access point, Node B, evolved Node B (eNode B or eNB), base transceiver station (BTS), or the like.

A cell 140 may be an area associated with the first base station 120 and the second base station 130, such that the UE 110, when located within the cell 140, may connect to or otherwise access both the first and second RATs, as supported by the first base station 120 and the second base station 130 (e.g., receive signals from and transmit signals to the first base station 120 and the second base station 130), respectively. The cell 140 may be a defined area, or may refer to an undefined area in which the UE 110 may access the RATs supported by the base stations.

In various embodiments, the UE 110 may be configured to access the RATs from the first base station 120 and/or the second base station 130 (e.g., receive/transmit signals of the first and/or the second RAT from/to the first base station 120 and/or the second base station 130). The UE 110 may be configured to access the RATs by virtue of the multi-SIM and/or the multi-mode SIM configuration of the UE as described, such that when a SIM corresponding to a RAT is received, the UE 110 may be allowed to access that RAT, as provided by the associated base station.

A multi-SIM device may be registered with more than one mobile network at the same time. In DSDA mobile devices when a SUB is in a voice call, a time is assigned for the voice call. The voice call timeslot also carries a control channel. In some embodiments, the control channel is a SACCH. Mobile devices use the SACCH channel to transmit measurement reports containing information related to the time used for the voice call and information related to the cell. In other embodiments, the control channel may be Stand-alone Dedicated Control Channel (SDCCH) or (Fast Associated Control Channel) FACCH.

It should be appreciated by one of ordinary skill in the art that FIG. 1 and its corresponding disclosure are for illustrative purposes, and that the system 100 may include three or more base stations. In some embodiments, three or more base stations may be present, where each of the three or more base stations may represent (i.e., transmits signals for) one or more separate RATs in the manner such as, but not limited to, described herein.

Figure 2:
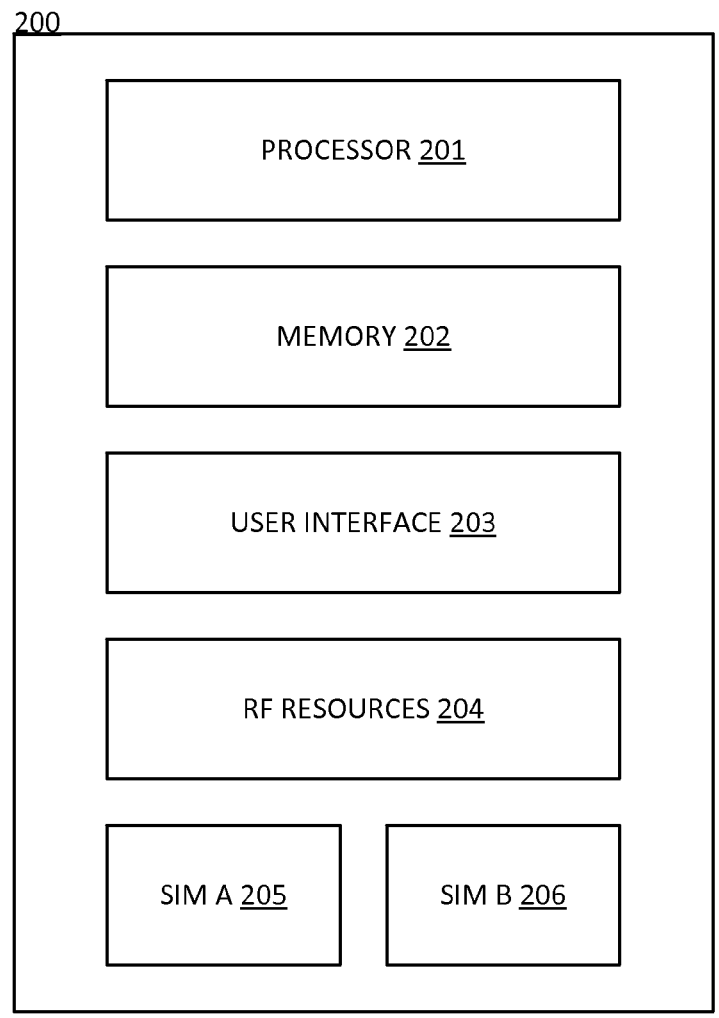
FIG. 2 is a functional block diagram illustrating an example of a user equipment according to various embodiments.

FIG. 2 is a functional block diagram of UE 200 suitable for implementing various embodiments. According to various embodiments, the UE 200 may be the same or similar to the UE 110 as described with reference to FIG. 1. With reference to FIGS. 1-2, the UE 200 may include at least one processor 201, memory 202 coupled to the processor 201, a user interface 203, one or more SIMs (as denoted SIM A 205 and SIM B 206).

The processor 201 may include any suitable data processing device, such as a general-purpose processor (e.g., a microprocessor), but in the alternative, the processor 201 may be any suitable electronic processor, controller, microcontroller, or state machine. The processor 201 may also be implemented as a combination of computing devices (e.g., a combination of a DSP and a microprocessor, a plurality of microprocessors, at least one microprocessors in conjunction with a DSP core, or any other such configuration). The memory 202 may be operatively coupled to the processor 201 and may include any suitable internal or external device for storing software and data for controlling and use by the processor 201 to perform operations and functions described herein, including, but not limited to, random access memory RAM, read only memory ROM, floppy disks, hard disks, dongles, or the like. The memory 202 may store an operating system ("OS"), as well as user application software and executable instructions. The memory 202 may also store application data, such as an array data structure.

The user interface 203 may include a display and a user input device. In some embodiments, the display may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, and the like. In various embodiments, the user input device may include any suitable device that receives input from the use, the user input device including, but not limited to one or more manual operator (such as, but not limited to a switch, button, touchscreen, knob, slider or the like), microphone, camera, image sensor, and the like.

The processor 201 and the memory 202 may be coupled to the RF resources 204. In some embodiments, the RF resources 204 may be one set of RF resources such that only one RAT may be supported by the set of RF resources at any given time. In other embodiments, the RF sources may be a plurality of sets of RF resources, such that each set may support one RAT at a given time, thus enabling the UE 200 to support multiple RATs simultaneously, e.g., in a MSMA case. The RF resources 204 may include at least one baseband-RF resource chain with which each SIM in the UE 200 (e.g., the SIM A 205 and the SIM B 206) may be associated. The baseband-RF resource chain may include a baseband modem processor, which may perform baseband/modem functions for communications on at least one SIM, and may include one or more amplifiers and radios. In some embodiments, baseband-RF resource chains may share the baseband modem processor (i.e., a single device that performs baseband/modem functions for all SIMs on the UE 200). In other embodiments, each baseband-RF resource chain may include physically or logically separate baseband processors.

The RF resources 204 may include transceivers that perform transmit/receive functions for the associated SIM of the UE 200. The RF resources 204 may include separate transmit and receive circuitry, or may include a transceiver that combines transmitter and receiver functions. The RF resources 204 may each be coupled to a wireless antenna. In other embodiments, the RF resources 204 may allow for multiple receivers but one transmitter.

In some embodiments, the processor 201, the memory 202, and the RF resources 204 may be included in the UE 200 as a system-on-chip. In some embodiments, the one or more SIMs (e.g., SIM A 205 and SIM B 206) and their corresponding interfaces may be external to the system-on-chip. Further, various input and output devices may be coupled to components on the system-on-chip, such as interfaces or controllers.

The UE 110 is configured to receive one or more SIMs (e.g., SIM A 205 and SIM B 206), an example of which is described herein. A SIM in various embodiments may be a Universal Integrated Circuit Card (UICC) that is configured with SIM and/or USIM applications, enabling access to various RAT networks as described. The UICC may also provide storage for a phone book and other applications. Alternatively, in a CDMA network, a SIM may be a UICC removable user identity module (R-UIM) or a CDMA subscriber identity module (CSIM) on a card. A SIM card may have a CPU, ROM, RAM, EEPROM and I/O circuits. An Integrated Circuit Card Identity (ICCID) SIM serial number may be printed on the SIM card for identification. However, a SIM may be implemented within a portion of memory of the UE 200, and thus need not be a separate or removable circuit, chip or card.

A SIM used in various embodiments may store user account information, an IMSI, a set of SIM application toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home PLMN (HPLMN) code, etc.) to indicate the SIM card network operator provider.

In some embodiments, the UE 200 may include a first SIM interface (not shown), which may receive a first SIM (e.g., SIM A 205) which may be associated with one or more RATs. In addition, the UE 200 may also include a second SIM interface (not shown), which may receive a second SIM (e.g., SIM B 206) which may be associated with one or more RATs that may be different (or the same in some cases) than the one or more RATs associated with SIM A 205. Each SIM may enable a plurality of RATs by being configured as a multimode SIM, as described herein. In some embodiments, a first RAT enabled may be a same or different RAT as a second RAT (e.g., a DSDS device may enable two RATs where both of them may be GSM, or where one of them may be GSM and the other may be W-CDMA). In addition, two RATs (which may be the same or different) may each be associated with a separate subscription, or both of them may be associated with a same subscription. For example, a DSDS device may enable LTE and GSM, where both of the RATs enabled may be associated with a same subscription, or, in other cases, LTE may be associated with a first subscription and GSM may be associated with a second subscription different from the first subscription.

In some embodiments in which the UE 200 comprises a smart phone or other mobile phone device, the UE 200 may have existing hardware and software for telephone and other typical wireless telephone operations, as well as additional hardware and software for providing functions as described herein. Such existing hardware and software includes, for example, one or more input devices (such as, but not limited to keyboards, buttons, touchscreens, cameras, microphones, environmental parameter or condition sensors), display devices (such as, but not limited to electronic display screens, lamps or other light emitting devices, speakers or other audio output devices), telephone and other network communication electronics and software, processing electronics, electronic storage devices and one or more antennae and receiving electronics for receiving various RATs. In such embodiments, some of that existing electronics hardware and software may also be used in the systems and processes for functions as described herein.

Accordingly, such embodiments can be implemented with minimal additional hardware costs. However, other embodiments relate to systems and process that are implemented with dedicated device hardware (UE 200) specifically configured for performing operations described herein. Hardware and/or software for the functions may be incorporated in the UE 200 during manufacturing, for example, as part of the original equipment manufacturer's ("OEM's") configuration of the UE 200. In further embodiments, such hardware and/or software may be added to the UE 200, after manufacturing of the UE 200, such as by, but not limited to, installing one or more software applications onto the UE 200.

In some embodiments, the UE 200 may include, among other things, additional SIM(s), SIM interface(s), additional RF resource(s) (i.e., sets of RF resources) associated with the additional SIM(s), and additional antennae for connecting to additional RATs supported by the additional SIMs.

Figure 3:
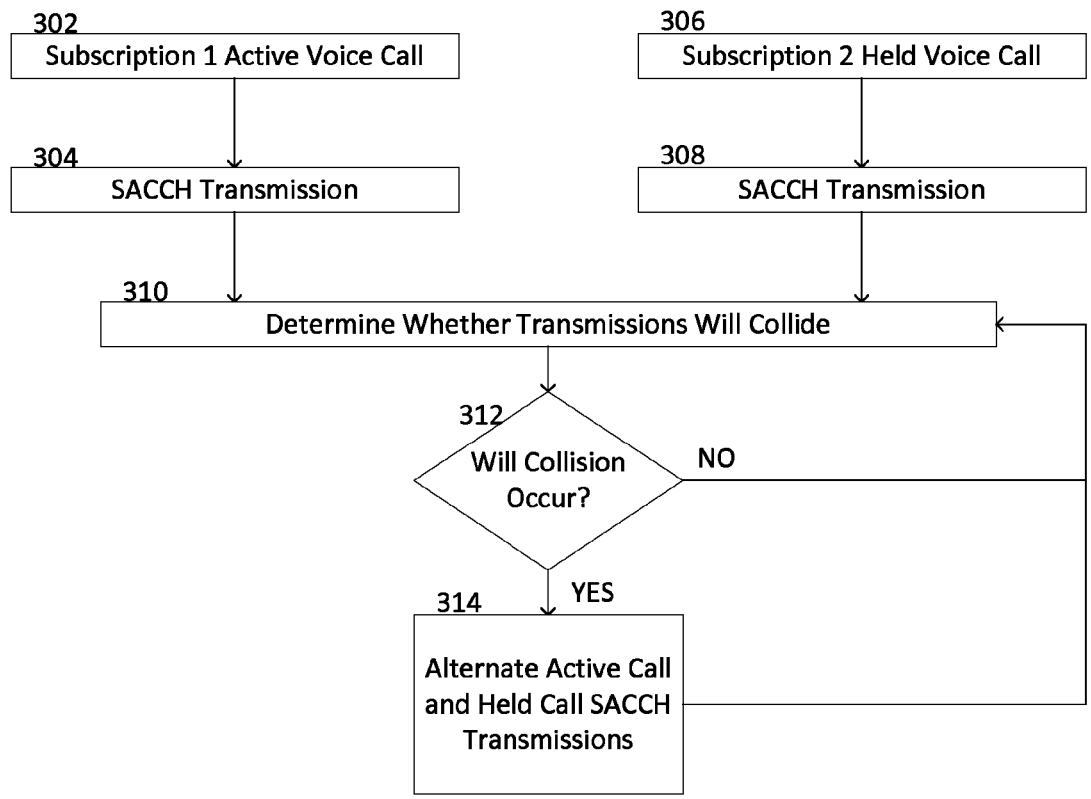
FIG. 3 is a process flowchart illustrating an example of a collision resolution process according to various embodiments.

FIG. 3 is a process flowchart 300 illustrating an example of a collision resolution process according to various embodiments. With reference to FIGS. 1-3, in various embodiments, a mobile device (e.g., 200) has multiple active SUBs, each with a voice call. Each SUB has its own receiver, but may not have its own transmitter (e.g., to save hardware costs). In DSDA devices with two receivers and one transmitter, when subscription 1 is in an voice call (302) and subscription 2 is in a held voice call (306), only one SACCH transmission may be sent at a time. In particular embodiments, when SUB 1 is in an active voice call (302) and SUB 2 is in a held voice call (306), the SACCH transmissions from the two SUBs are alternated. SACCH transmission for subscription 1 (304) and SACCH transmission for subscription 2 (308) may line up. In some embodiments, 3GPP GERAN standard specification TS 45.008 may be used for transmission. When transmissions line up, uplink SACCH collision occurs because the SACCHs must share the one transmitter. A determination is made (e.g., by the processor 201 and/or RF resources 204) regarding whether the transmissions will collide (310). In some embodiments, GERAN Layer 1 is used to determine collision occurrence. When the result of the determination is that collision will not occur (312: No), the SAACH transmissions are sent without modification. When the result of the determination is that collision will occur (312: Yes), to avoid collision, SACCH transmissions of the active call and SACCH transmissions of the held call are alternated (314). Because networks interpolate any missed measurement reports, this process may be implemented under conditions when signal strength and signal quality are good for both calls. This process allows both calls to be maintained, reducing handover triggering and call dropping. In some embodiments, the active voice call is on a first network and the held voice call is on a second network. In other embodiments, the active call is on the second or another (e.g., a third) network and the held voice call is on the first or another (e.g., a third) network.

Figure 4:
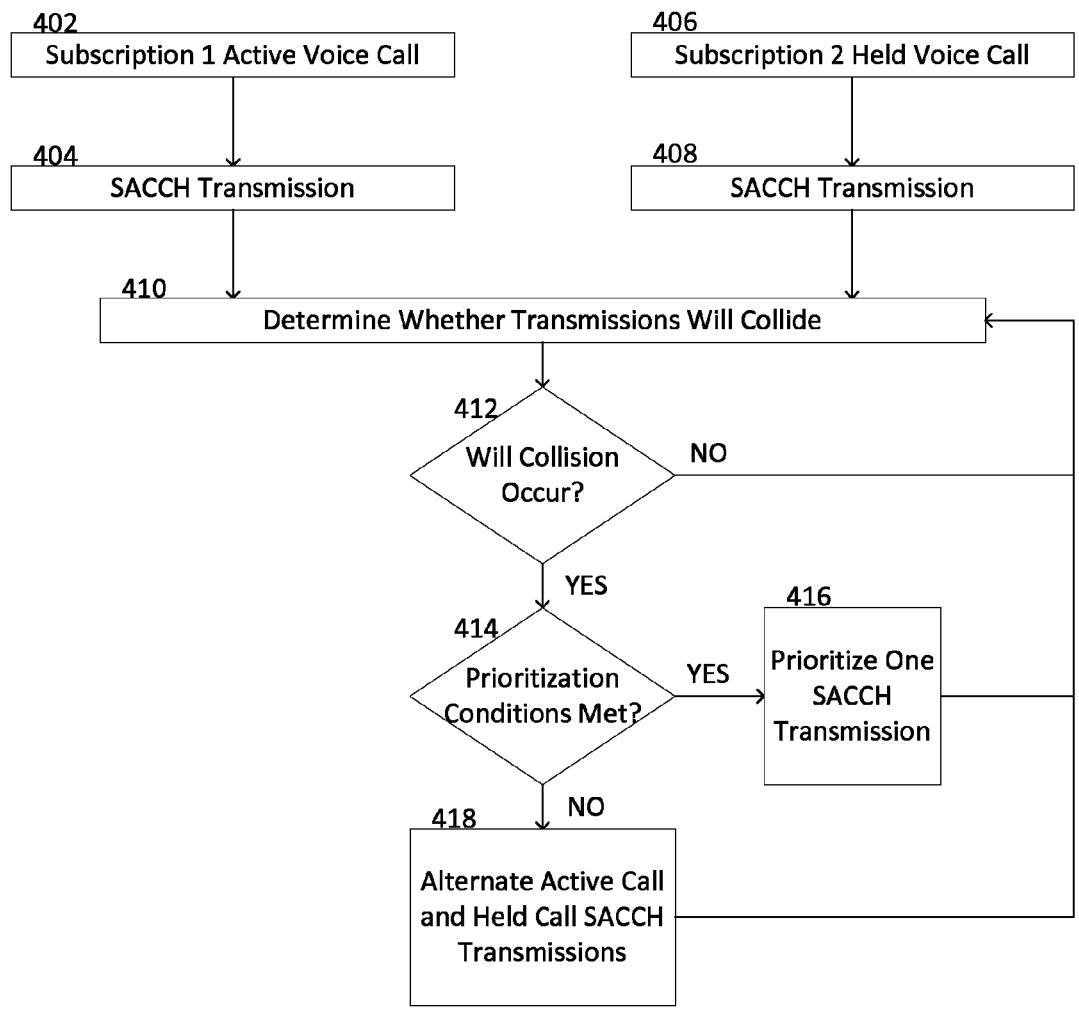
FIG. 4 is a process flowchart illustrating an example of a collision resolution process with prioritization according to various embodiments.

FIG. 4 is a process flowchart 400 illustrating an example of a collision resolution process with prioritization according to various embodiments. When the conditions of one or both of the calls are not favorable, it may be desirable to take a proactive approach and prioritize one of the calls, rather than potentially dropping both calls. In particular embodiments, when the determination indicates collision, when one or more prioritization conditions are met, one SACCH transmission is prioritized in the alternating transmissions. The transmissions are still alternated, but the prioritized SACCH transmission is transmitted when it otherwise would have been blanked in the alternating SACCH transmissions.

With reference to FIGS. 1-4, according to flowchart 400, SUB 1 is in an active voice call (402), and SUB 2 is in a held voice call (406). SACCH transmission for subscription 1 (404) and SACCH transmission for subscription 2 (408) may line up. In various embodiments, 3GPP GERAN standard specification TS 45.008 may be used for transmission. A determination is made (e.g., by the processor 201 and/or RF resources 204) regarding whether the transmissions will collide (410). In some embodiments, GERAN Layer 1 is used to determine collision occurrence. When the result of the determination is that collision will not occur (412: No), the SAACH transmissions are sent without modification. When the result of the determination is that collision will occur (412: Yes), a determination is made (e.g, by the processor 201 and/or RF resources 204) whether prioritization conditions are met (414). If prioritization conditions are met (414: Yes), then one SACCH transmission is prioritized (416). If prioritization conditions are not met (414: No), then SACCH transmissions of the active call and SACCH transmissions of the held call are alternated (418). In some embodiments, a prioritization condition may be one SUB having a signal strength below a preset strength threshold, or one SUB having a signal quality below a preset quality threshold.

Figure 5:
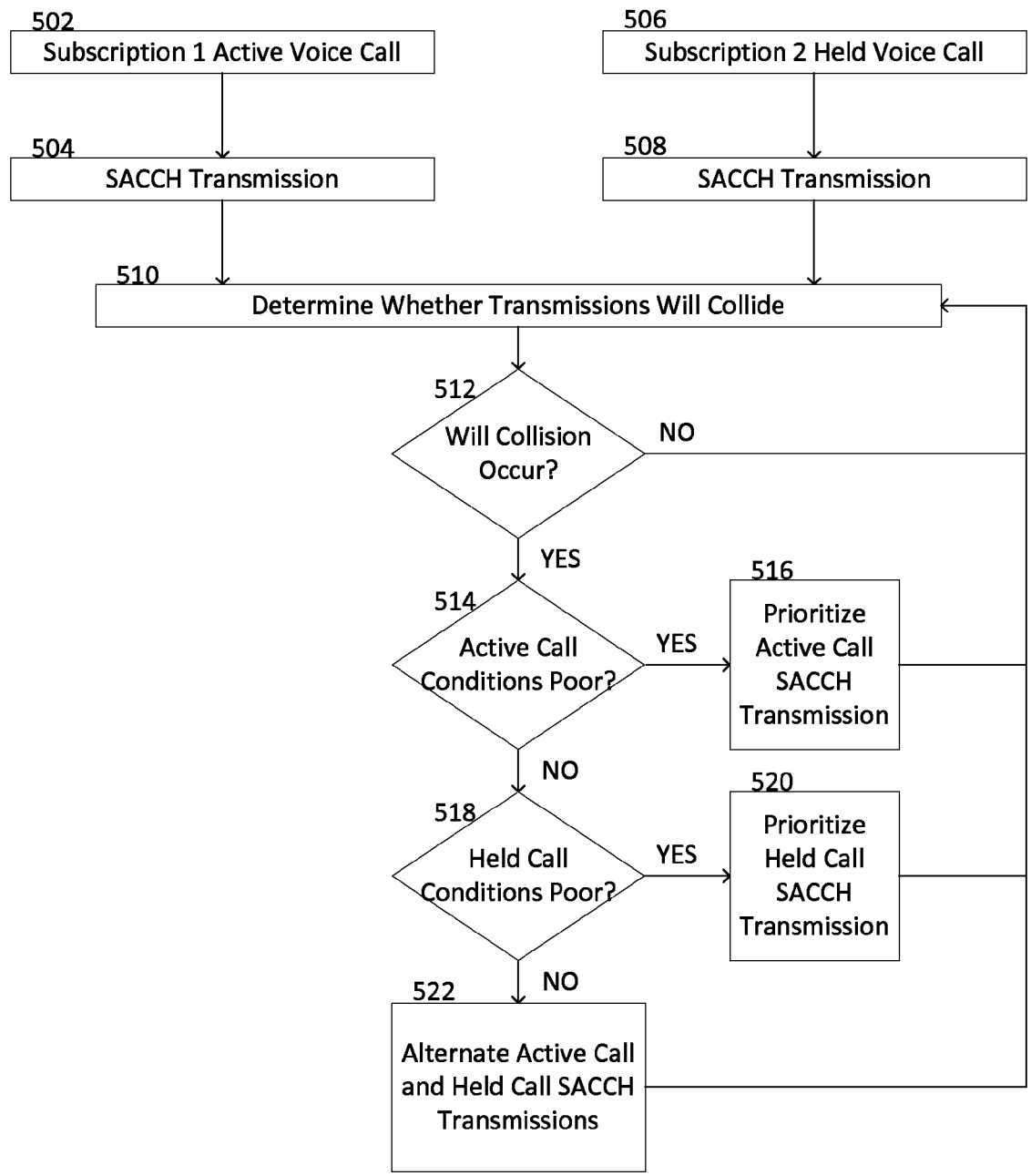
FIG. 5 is a process flowchart illustrating an example of a collision resolution process prioritizing an active voice call according to various embodiments.

FIG. 5 is a process flowchart 500 illustrating an example of a collision resolution process prioritizing the active voice call according to various embodiments. In some embodiments, when the active call conditions are poor, the SACCH transmission for the active call is prioritized. In particular, in the situation where the active call conditions are bad, regardless of the held call conditions, various embodiments are configured to favor the active call, such that during the alternation when a SACCH transmission of the active call would be blanked (i.e., not transmitted), the SACCH transmission is instead not blanked, and is sent.

With reference to FIGS. 1-5, according to flowchart 500, SUB 1 is in an active voice call (502), and SUB 2 is in a held voice call (506). SACCH transmission for subscription 1 (504) and SACCH transmission for subscription 2 (508) may line up. In some embodiments, 3GPP GERAN standard specification TS 45.008 may be used for transmission. A determination is made (e.g., by the processor 201 and/or the RF resources 204) regarding whether the transmissions will collide (510). In some embodiments, GERAN Layer 1 is used to determine collision occurrence. When the result of the determination is that collision will not occur (512: No), the SAACH transmissions are sent without modification. When the result of the determination is that collision will occur (512: Yes), whether the active call conditions are poor is determined (514). If the active call conditions are poor (514: Yes), the active call is favored and the SACCH transmission of the active call is prioritized (516). If the active call conditions are not poor (514: No), whether the held call conditions are poor is determined (518). If the held call conditions are poor (518: Yes), the SACCH transmission of the held call is prioritized (520). If the held call conditions are not poor (518: No), then both the active call and held call conditions are good, and SACCH transmissions of the active call and SACCH transmissions of the held call are alternated (522). Because the process checks the active call conditions first, if the active call conditions are bad, then the active call is prioritized, regardless of the held call conditions. The process thus favors the active call.

Figure 6:
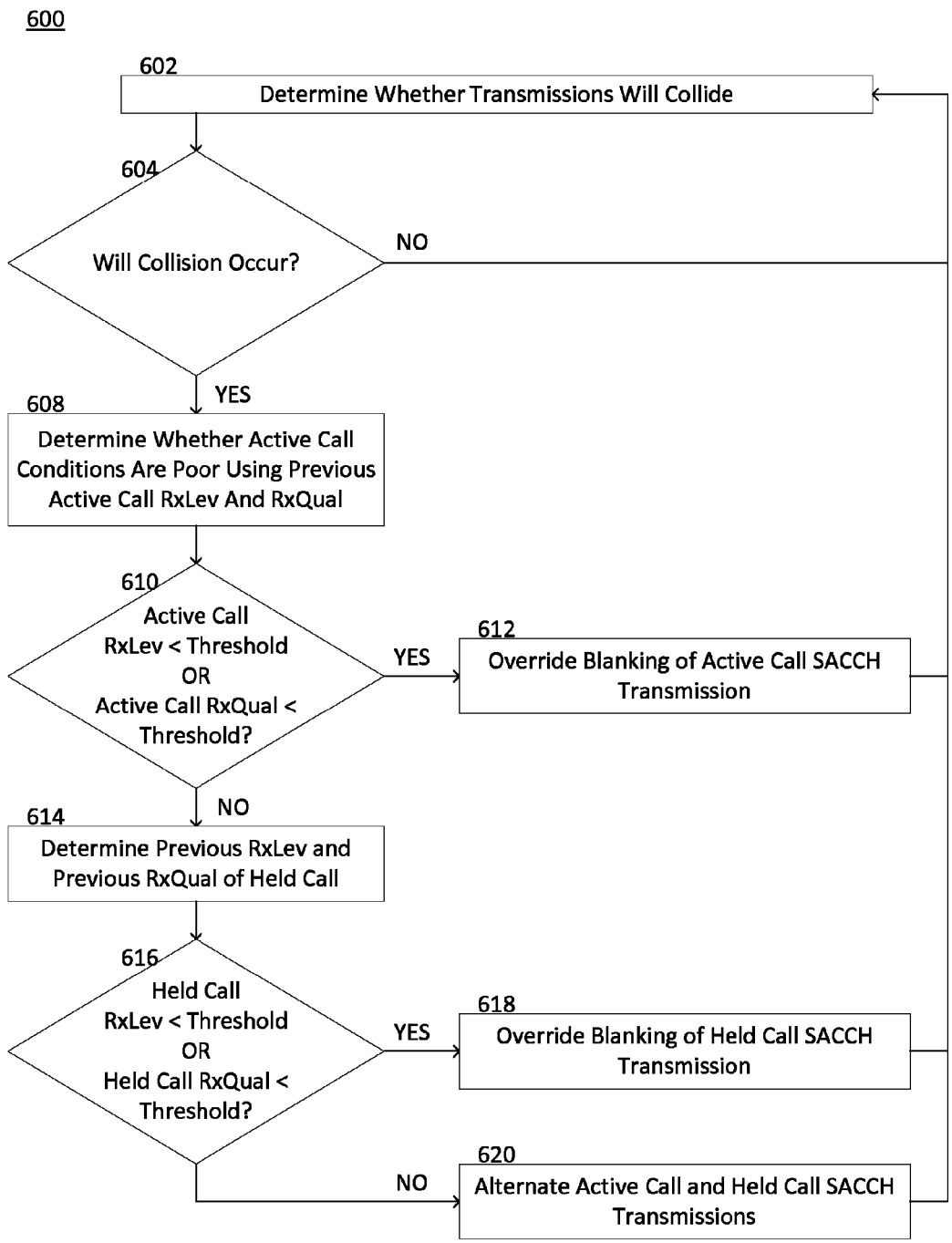
FIG. 6 is a process flowchart illustrating an implementation of the collision resolution prioritizing an active voice call according to various embodiments.

FIG. 6 is a process flowchart 600 illustrating an implementation of the collision resolution prioritizing the active voice call according to various embodiments. With reference to FIGS. 1-6, in various embodiments, a determination is made (e.g., by the processor 201 and/or the RF resources 204) regarding whether the transmissions will collide (602). In some embodiments, GERAN Layer 1 is used to determine collision occurrence. When the result of the determination is that collision will not occur (604: No), the SAACH transmissions are sent without modification. When the result of the determination is that collision will occur (604: Yes), whether the active call conditions are poor is determined by referring to active call signal information sent in the previous active call measurement report transmission (608). In some embodiments, the determination is based in part on signal strength and signal quality. In some embodiments, the previous active call signal strength value is compared to a preset strength threshold, and the previous call signal quality value is compared to a preset quality threshold, and whether the active call conditions are poor is determined when the previous active call signal strength is below the preset strength threshold, the previous active call signal quality value is below the preset quality threshold, or both (610). When the active call conditions are poor (610: Yes), the active call SACCH transmission is prioritized by overriding blanking of active call SACCH transmissions, allowing them to be sent when the alternating process would normally blank them (612). When the active call conditions are not poor (610: No), whether the held call conditions are poor is determined by referring to held call signal information sent in the previous held call measurement report transmission (614). In some embodiments, the determination is based in part on signal strength and signal quality.

In some embodiments, the previous held call signal strength value is compared to a preset strength threshold, and the previous held call signal quality value is compared to a preset quality threshold, and whether the held call conditions are poor is determined when the previous held call signal strength is below the preset strength threshold, the previous held call signal quality value is below the preset quality threshold, or both (616). When the held call conditions are poor (616: Yes), the held call SACCH transmission is prioritized by overriding blanking of held call SACCH transmissions, allowing them to be sent when the alternating process would normally blank them (718). When the held call conditions are not poor (616: No), then both the active call and held call conditions are good, and SACCH transmissions of the active call and SACCH transmissions of the held call are alternated (620).

In particular embodiments, the signal strength value is RxLev of the 3GPP GERAN standard specification. The RxLev parameter indicates signal strength (e.g., in dBm). In some embodiments, the RxLev parameter value is a value in the range of −48 dBm to −110 dBm of the 3GPP GERAN standard specification TS 45.008 (or other range of another predefined standard), with −48 dBm indicating a best signal strength and −110 dBm indicating a worst signal strength. To determine whether call conditions are poor, the RxLev parameter value in the previous measurement report for a call may be compared to a preset value. In some embodiments, a call condition may be considered poor when the comparison of the RxLev parameter value indicates the signal strength is less than a preset value (such as, but not limited to, −90 dBm, or another preset value in the range of −48 to −110 dBm).

In particular embodiments, the RxQual parameter indicates signal quality, with a value within a range set by a predefined standard or quality measurement. In some embodiments, the RxQual parameter value is a value in the range of 0 to 7 of the 3GPP GERAN standard specification TS 45.008 (or other range of another predefined standard), where the range corresponds to a range of bit error rates (BER), with 0 indicating a low value of BER and 7 indicating a high value of BER. To determine whether call conditions are poor, the RxQual parameter value in the previous measurement report for a call may be compared to a preset value. In some embodiments, a call condition may be considered poor when the RxQual parameter value indicates the signal quality is "less" than a preset value (such as, but not limited to, 4). That is, a signal quality value of 5 would be less than a signal quality value of 4, since a value of 5 would indicate a higher value of BER, and thus a worse signal quality.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for resolving control channel transmission collision in a mobile device having first and second subscriptions (SUBs) when the first SUB is in an active voice call and the second SUB is in a held voice call, the method comprising:
   determining, by the mobile device, whether a control channel transmission of the first SUB would collide with a control channel transmission of the second SUB; and
   alternating, by the mobile device, the first SUB control channel transmission and the second SUB control channel transmission to avoid collision, in response to determining the first SUB control channel transmission would collide with the second SUB control channel transmission, the method further comprising:
   when the determining indicates collision, determining, by the mobile device, whether the active call conditions are poor;
   when the determining of the active call conditions indicates the active call conditions are not poor, determining, by the mobile device, whether the held call conditions are poor; and
   when the determining of the held call conditions indicates the held call conditions are not poor, alternating, by the mobile device, first SUB control channel transmission and second SUB control channel transmission.

2. The method of claim 1,
   wherein the mobile device is a Dual SIM dual Active (DSDA) mobile device comprising two SIMs, two receivers, and one transmitter;
   the method further comprising:
   receiving the first SUB on one receiver;
   receiving the second SUB on the other receiver; and
   transmitting the first SUB control channel transmission and the second SUB control channel transmission on the one transmitter.

3. The method of claim 1, the method further comprising:
   when the determining indicates collision and one or more prioritization conditions are met, prioritizing, by the mobile device, control channel transmission for one SUB over control channel transmission for the other SUB, by transmitting control channel transmission of the one SUB when the one SUB would otherwise have been blanked in the alternating of first and second SUB control channel transmissions.

4. The method of claim 3,
   wherein a prioritization condition comprises the one SUB having a signal strength below a preset strength threshold or the one SUB having a signal quality below a preset quality threshold.

5. The method of claim 1, the method further comprising:
   when the determining of the active call conditions indicates the active call conditions are poor, prioritizing, by the mobile device, first SUB control channel transmissions.

6. The method of claim 1, the method further comprising:
   when the determining of the held call conditions indicates the held call conditions are poor, prioritizing, by the mobile device, second SUB control channel transmissions.

7. The method of claim 1, the method further comprising:
   in the determining of the active call conditions, comparing, by the mobile device, previous active call signal strength value to a preset strength threshold and comparing, by the mobile device, previous active call signal quality value to a preset quality threshold.

8. The method of claim 7,
   wherein the active call conditions are sufficiently poor when the previous active call signal strength is below the preset strength threshold, the previous active call signal quality is below the preset quality threshold, or both.

9. The method of claim 1, wherein the control channel is SACCH.

10. The method of claim 1, wherein determining comprises determining, by the mobile device, whether a control channel transmission of the first SUB would collide with the control channel transmission of the second SUB, while both the first SUB and the second SUB are in a voice call.

11. The method of claim 1, wherein the first SUB is in the active voice call at the same time that the second SUB is in a held voice call.

12. The method of claim 1, wherein the determining occurs at a time when the first SUB is in the active voice call and the second SUB is in a held voice call.

13. A mobile device comprising:
    a processor configured to:
      determine whether a control channel transmission of a first SUB would collide with a control channel transmission of a second SUB; and
      alternate the first SUB control channel transmission and the second SUB control channel transmission to avoid collision, in response to determining that the first SUB control channel transmission would collide with the second SUB control channel transmission, wherein the mobile device is further configured to:
    determine, when the determining indicates collision, whether the active call conditions are poor;
    determine, when the determining of the active call conditions indicates the active call conditions are not poor, whether the held call conditions are poor; and
    alternate, when the determining of the held call conditions indicates the held call conditions are not poor, first SUB control channel transmission and second SUB control channel transmission.

14. The mobile device in claim 13,
    wherein the mobile device is a Dual SIM dual Active (DSDA) mobile device comprising two SIMs, two receivers, and one transmitter,
    wherein the mobile device is configured to:
    receive the first SUB on one receiver;
    receive the second SUB on the other receiver; and
    transmit the first SUB control channel transmission and the second SUB control channel transmission on the one transmitter.

15. The mobile device in claim 13, further configured to:
    when the determination indicates collision and one or more prioritization conditions are met, prioritize control channel transmission for one SUB over control channel transmission for the other SUB, by transmitting control channel transmission of the one SUB when the SUB would otherwise have been blanked in the alternating of the first and second SUB control channel transmissions.

16. The mobile device of claim 15,
    wherein a prioritization condition comprises the one SUB having a signal strength below a preset strength threshold, or the one SUB having a signal quality below a preset quality threshold.

17. The mobile device of claim 13, further configured to:
    prioritize, when the determining of the active call conditions indicates the active call conditions are poor, first SUB control channel transmissions.

18. The mobile device of claim 13, further configured to:
prioritize, when the determining of the held call conditions indicates the held call conditions are poor, second SUB control channel transmissions.

19. The mobile device of claim 13, further configured to:
compare, to determine the active call conditions, previous active call signal strength value to a preset strength threshold and previous active call signal quality value to a preset quality threshold.

20. The mobile device of claim 19,
wherein the active call conditions are sufficiently poor when the previous active call signal strength value is below the preset strength threshold, the previous active call signal quality value is below the preset quality threshold, or both.

21. The mobile device of claim 13, wherein the control channel is SACCH.

22. A non-transitory computer-readable recording medium storing therein at least one computer program, which, when executed, causes a computer to perform a method for resolving control channel transmission collision in a mobile device having first and second subscriptions (SUBS), when the first SUB is in an active voice call and the second SUB is in a held voice call, the method comprising:
determining that a control channel transmission of the first SUB would collide with a control channel transmission of the second SUB; and
alternating the first SUB control channel transmission and the second SUB control channel transmission to avoid collision, in response to determining the first SUB control channel transmission would collide with the second SUB control channel transmission, the method further comprising:
when the determining indicates collision, determining, by the mobile device, whether the active call conditions are poor;
when the determining of the active call conditions indicates the active call conditions are not poor, determining, by the mobile device, whether the held call conditions are poor; and
when the determining of the held call conditions indicates the held call conditions are not poor, alternating, by the mobile device, first SUB control channel transmission and second SUB control channel transmission.

23. An apparatus for resolving control channel transmission collision in a mobile device having first and second subscriptions (SUBs) when the first SUB is in an active voice call and the second SUB is in a held voice call, the apparatus comprising:
means for determining, by the mobile device, whether a control channel transmission of the first SUB would collide with a control channel transmission of the second SUB; and
means for alternating, by the mobile device, the first SUB control channel transmission and the second SUB control channel transmission to avoid collision, in response to determining the first SUB control channel transmission would collide with the second SUB control channel transmission,
wherein the apparatus further comprises:
means for determining, when the determining indicates collision, whether the active call conditions are poor;
means for determining, when the determining of the active call conditions indicates the active call conditions are not poor, whether the held call conditions are poor; and
means for alternating, when the determining of the held call conditions indicates the held call conditions are not poor, first SUB control channel transmission and second SUB control channel transmission.

* * * * *